Aug. 2, 1932.        R. B. SHANCK        1,869,515
MEASUREMENT OF ATTENUATION AND NOISE
Filed Dec. 22, 1931

Figure 1:
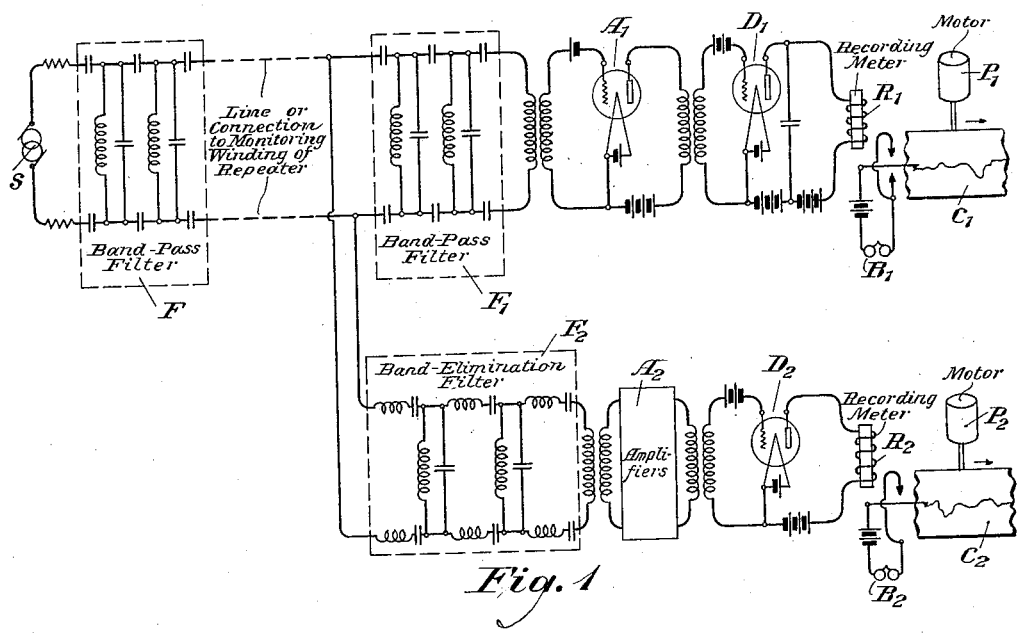

M = Measuring circuits as shown in Fig. 1.

INVENTOR
R. B. Shanck
BY
ATTORNEY

Patented Aug. 2, 1932

1,869,515

UNITED STATES PATENT OFFICE

ROY B. SHANCK, OF DOUGLAS MANOR, NEW YORK, ASSIGNOR TO AMERICAN TELEPHONE AND TELEGRAPH COMPANY, A CORPORATION OF NEW YORK

MEASUREMENT OF ATTENUATION AND NOISE

Application filed December 22, 1931. Serial No. 582,668.

This invention relates to systems for the transmission of alternating currents, and more particularly to the measurement of attenuation and noise in telephone and telegraph circuits.

The principal object of the invention is the simultaneous indication at repeater points or other points on a transmission circuit of the attenuation of the transmitted currents and of the noise on the circuit.

A further object of the invention is the giving of an alarm when the attenuation varies beyond predetermined limits or the noise becomes excessive.

In general, the applicant, in accomplishing the above-stated objects, sends over the transmission circuit alternating current of a suitable testing frequency, employs two detectors in separate branches of the transmission path, impresses on the first detector the current of the testing frequency and records the variations of the detector output to obtain the attenuation measurement, and impresses on the second detector the received energy outside a narrow band including the testing frequency and records the output variations of this second detector to obtain the noise measurement.

The invention will be clearly understood when the following description is read with reference to the accompanying drawing.

Figure 1 of the drawing shows diagrammatically the preferred circuit and apparatus arrangement for obtaining the simultaneous indication of variations of attenuation and noise.

Figure 2:
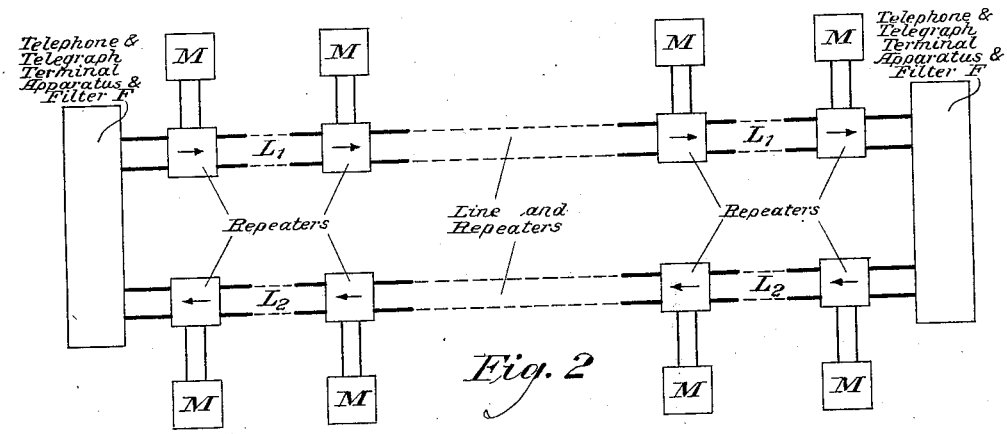

Fig. 2 shows schematically how the measuring apparatus is associated with a two-way four-wire transmission system at each of a plurality of repeater points.

With reference to Fig. 1, alternating current of a suitable frequency is sent out from the source S through a narrow-band pass filter F, which serves to eliminate extraneous frequencies. At some distant point at which it is desired to record attenuation and noise variations, the transmission path is divided into two branches.

In the first branch of the transmission path are an amplifier $A_1$ and a detector $D_1$. The transmitted energy is passed through a narrow-band-pass filter $F_1$, which limits the input of amplifier $A_1$ substantially to the testing frequency. A recording meter $R_1$ has its winding included in the output circuit of detector $D_1$, and the armature of this meter responds to the rectified energy. A moving shart $C_1$ is driven by some such apparatus as the motor $P_1$, and the armature is arranged to impress a record on the chart. If the increase or decrease of attenuation, represented by the current in the output circuit of detector $D_1$, exceeds a predetermined value, a circuit is closed through a battery and an alarm bell $B_1$.

In the second branch of the transmission path are suitable amplifiers $A_2$ and a detector $D_2$. The energy entering this branch is passed through a band-elimination filter $F_2$ designed to eliminate a narrow band of frequencies having at its mid-point the testing frequency used for the attenuation measurement. The recording meter $R_2$ responds to variations of the rectified energy in the output circuit of detector $D_2$, and accordingly a record of the noise in the transmission path is impressed on the chart $C_2$, which is driven by the motor $P_2$, for instance. If the noise reaches a predetermined upper limit, the armature of meter $R_2$ closes a circuit through a battery and an alarm bell $B_2$, which serves to give an audible announcement of the excess of noise.

With the above-described arrangement, the applicant obtains simultaneous indications of attenuation (or transmission equivalent) and noise at the measuring point—along with a graphic record of each measurement and suitable audible alarm signals.

As is indicated in Fig. 1, the connection of the measuring branches may be to the transmission line or to the monitoring winding of a repeater included in the transmission system.

In Fig. 2 there is shown schematically a two-way four-wire system for the transmission of telephone and telegraph signals. At each terminal there is indicated telephone and telegraph apparatus, and the terminals are interconnected by the two one-way lines $L_1$ and $L_2$. It is understood that suitable apparatus is provided at each terminal, including a narrow-band-pass filter such as F of Fig. 1, for sending out the testing current. Two terminal one-way repeaters are indicated in association with each terminal, and in addition each of the paths $L_1$ and $L_2$ is equipped with a plurality of intermediate one-way repeaters. Apparatus M, which is like that shown in Fig. 1 and consists of the two branch paths and the included recording and alarm elements, is connected to each repeater of the system, for instance through the monitoring windings.

While the invention has been disclosed in a certain specific embodiment for the purpose of illustration, it is understood that the true scope of the invention is determined by the appended claims.

What is claimed is:

1. The method of simultaneously measuring attenuation and noise in a circuit for the transmission of alternating currents, which consists in sending over the circuit a testing frequency, segregating the testing frequency from other frequencies at a distant point, observing the variations of the current of the testing frequency to obtain the indication of attenuation variation, and simultaneously observing the variations of received energy outside a narrow band of frequencies including the testing frequency to obtain the indication of the noise on the circuit.

2. In a system for the transmission of alternating currents, a transmission path, means for transmitting electrical waves thereover, means at a point distant therefrom for measuring the attenuation of the transmitted currents, and means at said distant point for measuring the noise received at said point over said transmission path.

3. In a system for the transmission of alternating currents, a transmission path, means for transmitting thereover a testing frequency, means at a testing point distant therefrom for segregating said testing frequency, means associated therewith for measuring the attenuation of the testing frequency, means at said point for eliminating said testing frequency, and means associated therewith for measuring the energy passed therethrough.

4. In a system for the transmission of alternating currents, a transmission path, means for transmitting thereover a testing frequency, and means associated with said path at a point distant from said transmitting means for measuring attenuation and noise, said measuring means comprising two branch paths of said transmission path, a filter in the first branch path for passing a narrow band of frequencies including said testing frequency, means in said first branch path for indicating the magnitude of the energy passed through said band-pass filter, a filter in the second branch path for eliminating said band of frequencies, and means in said second branch path for indicating the magnitude of the energy passed through said band-elimination filter.

5. In a system for the transmission of alternating currents, a transmission path, means for transmitting over said path alternating current of a testing frequency a first detector and a second detector associated with said path at a point distant from said transmitting means, means for impressing on said first detector a narrow band of frequencies including said testing frequency, means for recording variations of the output current of said first detector, means for impressing on said second detector energy received at said distant point of frequencies outside said band, and means for recording variations of the output current of said second detector.

In testimony whereof, I have signed my name to this specification this 18th day of December, 1931.

ROY B. SHANCK.